United States Patent [19]

Numata et al.

[11] Patent Number: 5,010,936
[45] Date of Patent: Apr. 30, 1991

[54] RADIAL TIRE INCLUDING A NARROW GROOVE IN THE TREAD SHOULDER

[75] Inventors: Kazuki Numata, Nishinomiya; Kiyoshi Ochiai, Kobe, both of Japan

[73] Assignee: Sumitomo Rubber Industries, Ltd., Hyogo, Japan

[21] Appl. No.: 385,148

[22] Filed: Jul. 26, 1989

[30] Foreign Application Priority Data

Aug. 11, 1988 [JP] Japan .................... 63-202558

[51] Int. Cl.$^5$ ............................................. B60C 11/03
[52] U.S. Cl. ................................ 152/209 R; 152/454
[58] Field of Search .............. 152/209 R, 209 D, 523, 152/454

[56] References Cited

U.S. PATENT DOCUMENTS

| | | | |
|---|---|---|---|
| 3,508,594 | 4/1970 | French | 152/209 R |
| 3,559,712 | 2/1971 | Verdier | 152/209 R |
| 4,214,618 | 7/1980 | Takigawa et al. | 152/209 D |
| 4,262,722 | 4/1981 | Takigawa et al. | 152/209 R |
| 4,480,671 | 11/1984 | Giron | 152/209 R |
| 4,724,878 | 2/1988 | Kabe et al. | 152/454 X |

FOREIGN PATENT DOCUMENTS 256247 2/1988 European Pat. Off. ........ 152/209 R

Primary Examiner—John J. Gallagher
Assistant Examiner—Geoffrey L. Knable
Attorney, Agent, or Firm—Birch, Stewart, Kolasch & Birch

[57] ABSTRACT

A radial tire provided with a circumferentially extending narrow groove in a boundary region between a tread portion and a buttress portion, and the narrow groove is inclined axially inward at the bottom by an angle of 0 to 5 degrees to the normal direction to the tread face, whereby the occurrence of vehicle wandering is effectively prevented without producing uneven wear in the tread shoulder regions.

2 Claims, 6 Drawing Sheets

RADIAL TIRE INCLUDING A NARROW GROOVE IN THE TREAD SHOULDER

BACKGROUND OF THE INVENTION

The present invention relates to a radial tire which can control vehicle wandering.

In a radial tire in which a belt reinforcement layer, for example, a steel cord layer is disposed radially outwardly of the carcass, the rigidity of a tread portion becomes higher in the shoulder regions due to the hoop effect of the belt reinforcement and also the thicker tread rubber. Accordingly, the shoulder regions largely effect the occurrence of vehicle wadering when running on a road in which the surface is partially inclined in the side direction. Further, for example, when such a tire mounted on the steering axis of a vehicle runs across a step difference A in the road level such as a rut, a railway and the like, as shown in FIG. 6(a), if the side of the tire shoulder B bumps against the differnce A, the tire T changes from its travel course, and the vehicle can not ride over the difference without applying more steering.

Therefore, to round the tire shoulder B as shown in FIG. 6(b) and to form axial sipes in the tire shoulder B to reduce the rubber rigidity thereof have been proposed.

In the former situation, however, the higher rigidity of the tire shoulder still produces a wadering phenomenon and also a rather strong reaction against the riding-over operation, which worsens the ride.

In the latter situation, uneven wear such as the so-called heel and toe wear is apt to be produced in the tread should regions, which shorten the tire life.

SUMMARY OF THE INVENTION

It is, therefore, an object of the present invention to provide a radial tire in which the occurrence of vehicle wandering is effectively prevented without producing uneven wear in the tread shoulder regions.

In order to achieve the above-mentioned object, a radial tire according to the present invention is provided with a circumferentially extending narrow groove in a boundary region between a tread portion and a buttress portion of the tire, and the narrow groove is inclined axially inward at the bottom at an angle (beta) of 0 to 5 degrees to the normal direction to the tread face.

BRIEF DESCRIPTION OF THE DRAWINGS

An embodiment of the present invention will now be explained in datail with reference to the attached drawings, in which.

DETAILED DESCRIPTION OF THE INVENTION

Figure 1:
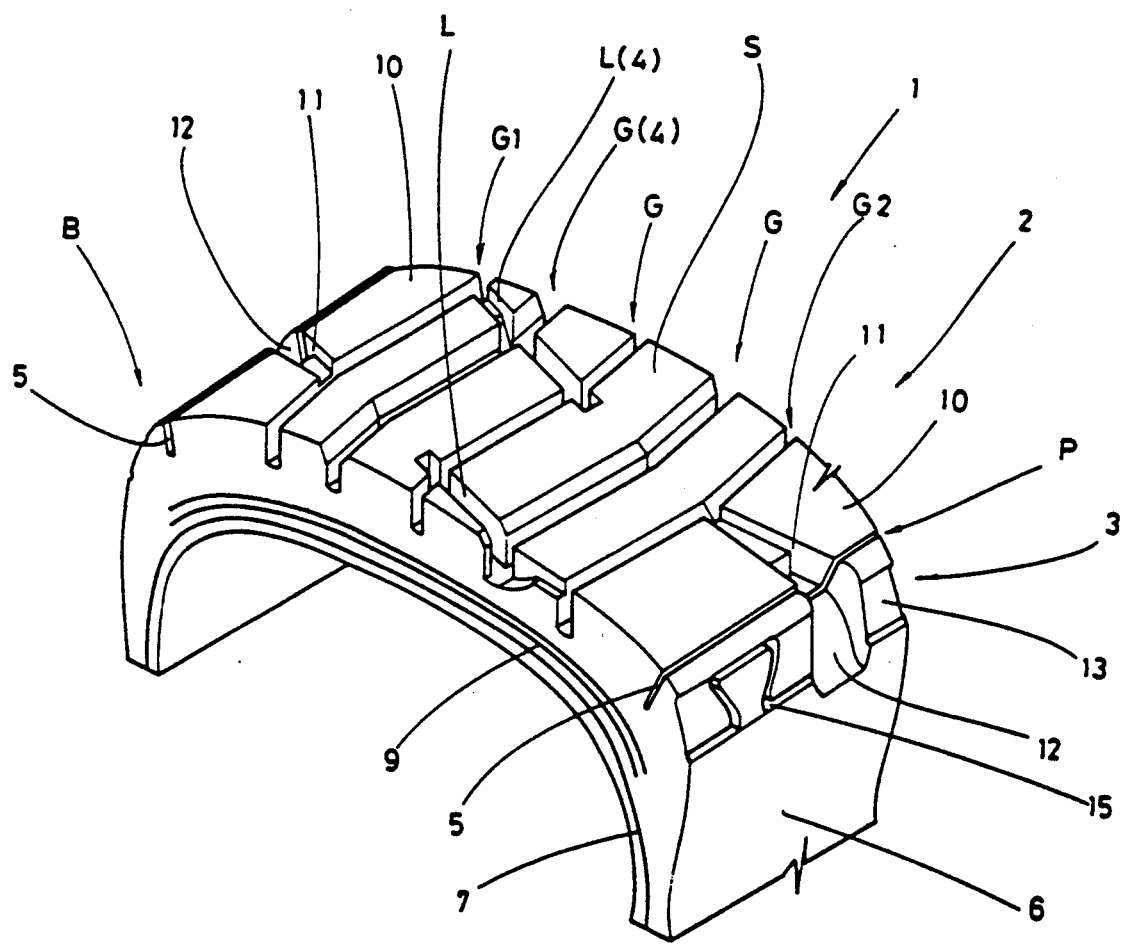
FIG. 1 is a perspective view showing an embodiment of the present invention.
Figure 2:
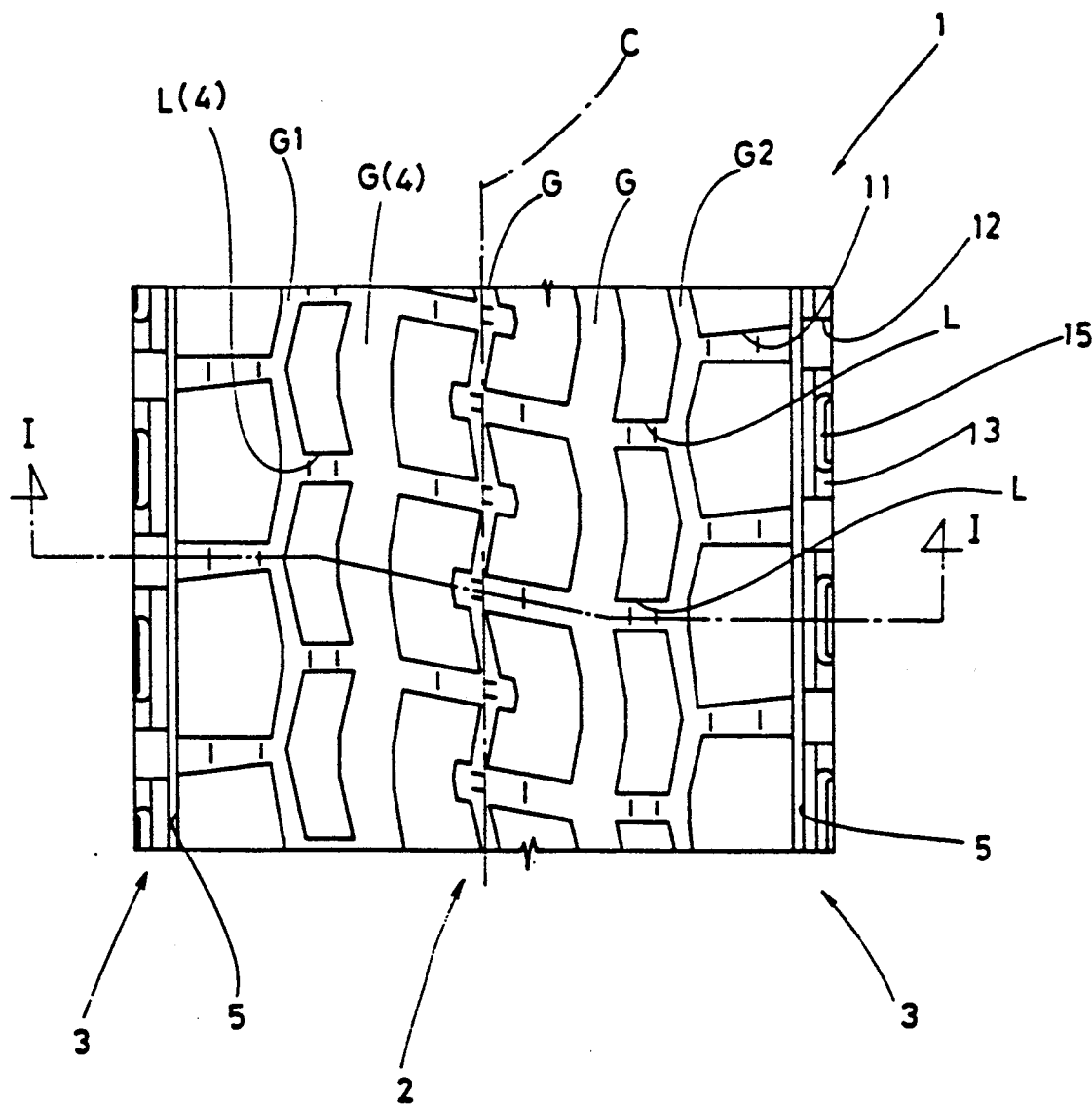
FIG. 2 is a plane view showing the tread portion thereof.
Figure 3:
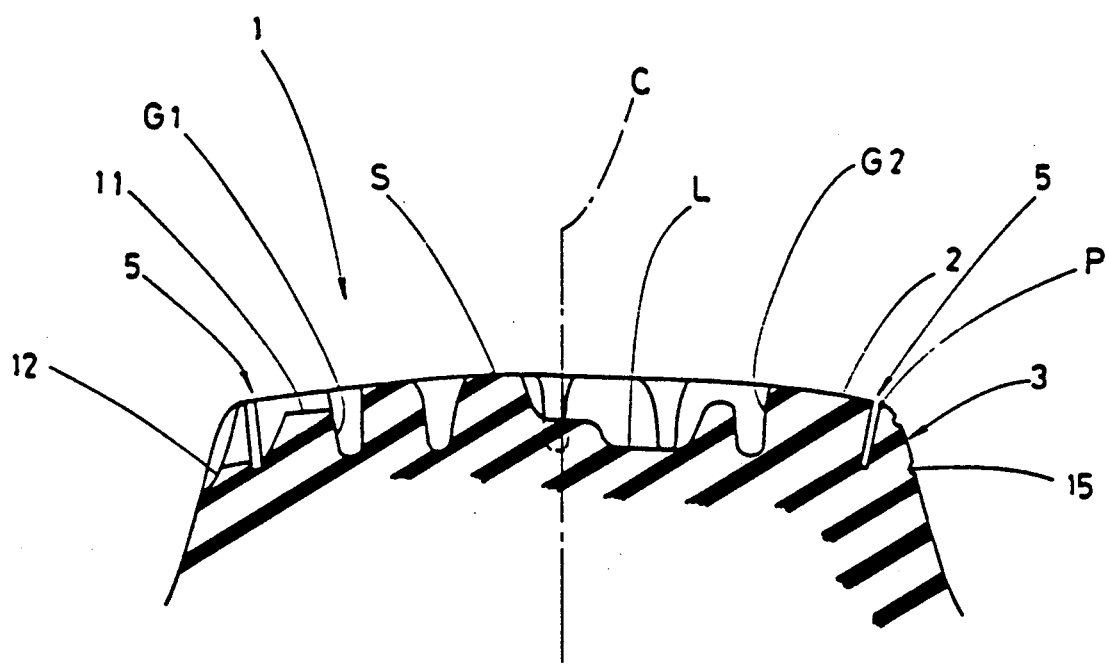
FIG. 3 is a sectional view taken along a line I—I of FIG. 2.

In FIGS. 1 and 2, a radial tire 1 has a tread portion 2, a pair of sidewall portions 6 and a pair of bead portions, and the tire comprises a radial ply carcass 7 extending across the bead portions through the sidewall portions and tread portion, a rubber tread and sidewalls on the carcass, and at least one belt layer 9 between the carcass and the tread composed of steel cords or the like.

The tread portion 2 is provided with tread grooves 4 to form an all-season type tread pattern which changes from a block pattern to a rib pattern as the tread wear progresses.

In this embodiment, therefore, the tread grooves 4 include five longitudinal main grooves G, G1, G2 extending zigzag in the circumferential direction of the tire, lateral grooves L laid across the longitudinal grooves G, and shoulder lateral grooves 11.

The shoulder lateral grooves 11 axially extend across the shoulder ribs 10 which are formed axially outside the outermost longitudinal grooves G1 and G2 to divide them into two rows of shoulder blocks.

The groove depths of the main grooves are identical to each other, and deeper then those of the lateral grooves L and 11, whereby the tread pattern changes from a block pattern to a rib pattern as the tread wear progresses.

The tread portion 2 is connected to the sidewall portions 6 through the buttress portions 3.

The buttress portions in this embodiment are provided with radiation grooves 12 extending axially and connected to the shoulder lateral grooves 11, and further, each is provided with a circumferentially extending wide and shallow grooved part 13 in which a narrow and shallow groove 15 is continuously and windingly for med in the circumferential direction of the tire, thereby increasing the heat radiation from the buttress region 3.

In the boundary region between the tread portion 2 and each buttress portion 3, a circumferentially extending narrow groove 5 is formed at a position near the intersection P between the surface of the tread portion and the surface of the buttress portion, in other words, at the edge of the ground contacting area of the tread.

Figure 4:
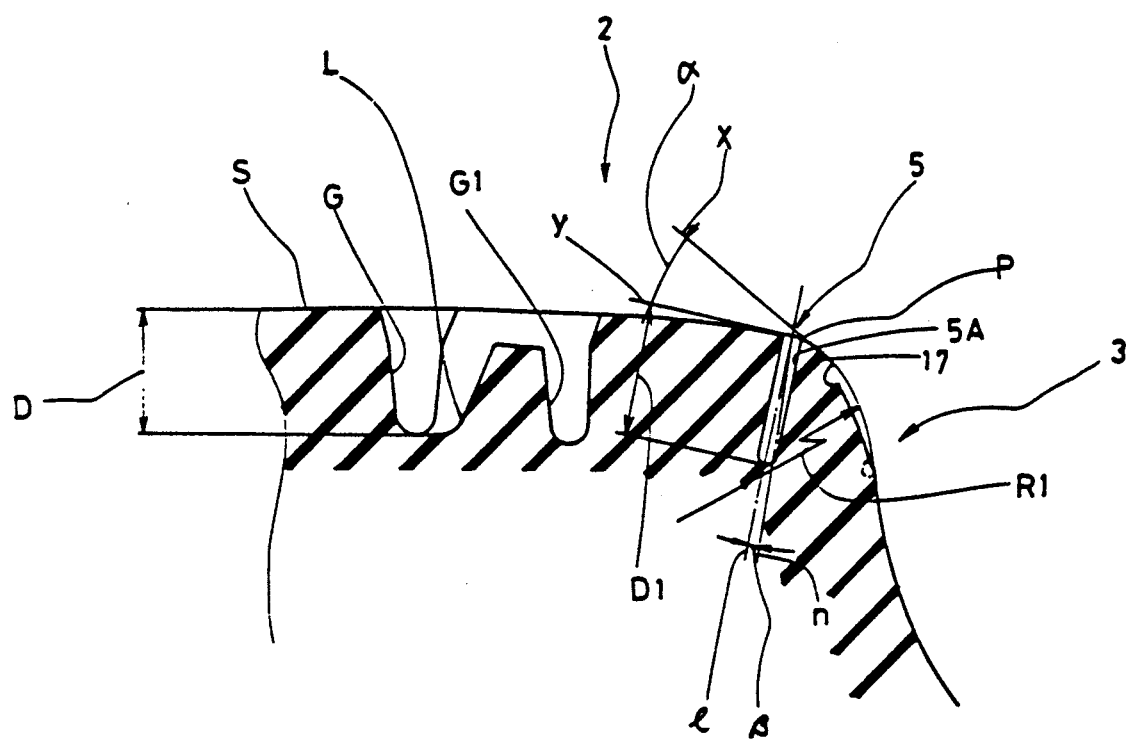
FIG. 4 is a enlarged sectional view showing the narrow groove.

In this embodiment, the radially outer edge of the axially outer groove sidewall 5A is positioned on the above-mentioned intersection P, as shown in FIG. 4.

And the center line 1 of the narrow groove 5 is inclined axially inwardly at the bottom by an angle (beta) between 0 to 5 degrees with respect to the normal line n drawn perpendicular to the tread surface S from the above-mentioned position near the intersection P in order to prevent a tearing failure.

The groove width of the narrow groove 5 is set to be less than 5 mm and more preferably about 2 mm.

The ratio $D1/D$ of the groove depth $D1$ from the tread surface S to the groove bottom, to the groove depth $D$ of the longitudinal main grooves is set to be 0.8 to 1.1.

By forming the narrow groove 5 is the above-mentioned form, the rigidity of the tread rubber is reduced in the shoulder regions B, thereby effectively suppressing the occurrence of vehicle wandering.

Figure 5A:
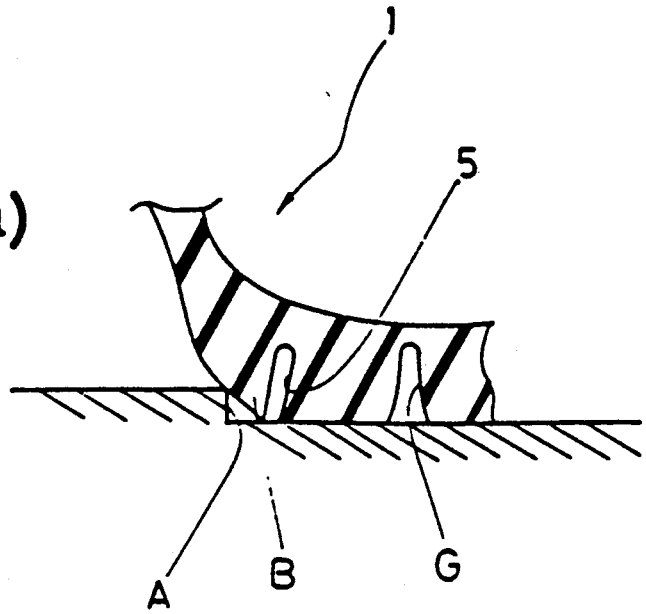
FIGS. 5(a) and (b) are schematic sectional views showing operations of the invention.
Figure 5B:
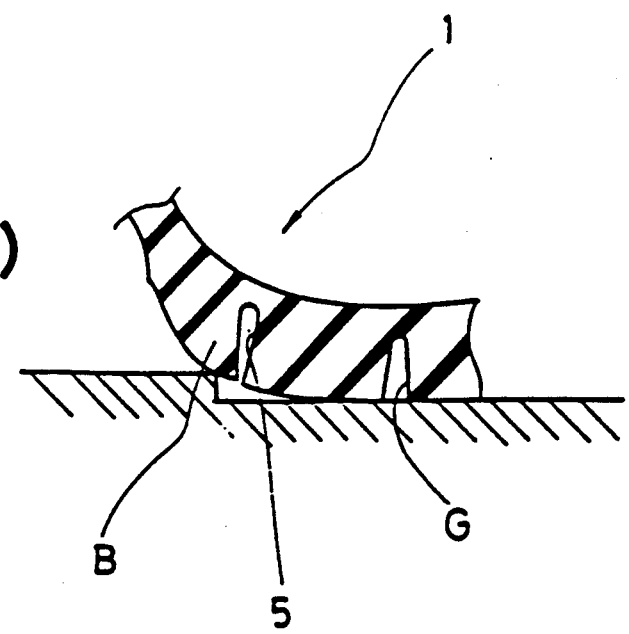
Figure 6:
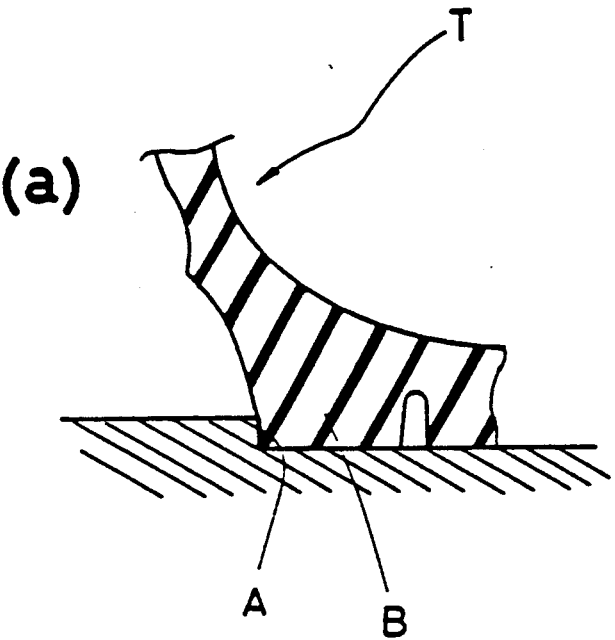
FIGS. 6(a) (b) are sectional views showing prior art tires.
Figure 6:
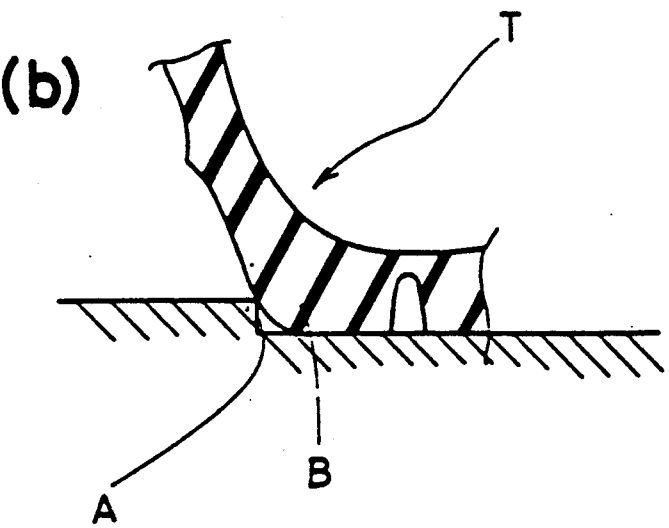

Further more, as the narrow groove 5 extends circumferentially of the tire, it does not produce the so-called heel and toe wear. Furthermore, as shown in FIGS. 5(a) and 5(b), when the tire 1 rides across a difference A on a road surface, the tire shoulder B is easily deformed, which produces a less reactive force.

As to the form of the buttress portion, the tangent X to the buttress portion 3 at the intersection P is inclined at an angle (alfa) between 25 and 35 degrees with respect to the tangent Y to the tread portion 2 at the same intersection P.

The contour of the buttress portion adjacent to the intersection P is formed in a circular arc having a radius R1 of 15 to 35 mm.

Thus, a part of the buttress portion 3 adjacent the intersection P, that is, the tire shoulder B is formed in a curved configuration having a specified radius and inclination angle, therefore which make it easy to ride over the difference A on a road.

On the other hand, the above-mentioned ranges for the inclination angles (alfa), (beta), the radius R1 and the ratio D1/D were obtained through various tests by the inventors.

In each of the tests of which results are respectively shown in Tables 1 to 4, the above-mentioned factors were identical through the test tires except for the concerned factor.

The test tires were mounted on the front wheels of a 2-D type truck, and then, while running at a speed of 60 km/h under the specific load, the wandering phenomenon and the stability were evaluated into 100 by feeling. The larger the index, the better the performance.

As shown in Tables 1 to 4, when the inclination angle (beta) is smaller than 0 degree or larger than 5 degrees, the decrease in the rigidity of the tire shoulder B is insufficient, and the wandering performance and the stability becomes worse. In particular, if it is smaller than 0 degree, the portions 17 formed outside the narrow groove 5 become thin in rubber thickness at the base part thereof, and this part is weakened to cause a tear failure.

When the inclination angle (alfa) is smaller than 25 degrees and the radius R1 is smaller than 15 mm, the ability to ride over a difference A becomes poor.

On the other hand, if (alfa) is larger than 35 degrees and the radius R1 is larger than 35 mm, the self-alignment torque decreases, thereby deteriorating the stability during straight running and cornering.

Further, when the ratio D1/D is less than 0.8, the rigidity of the shoulder region B does not decrease sufficiently, and when it is over 1.1, the rigidity become too low, thereby deteriorating the stability and inducing the occurrence of rib tear failure.

COMPARISON TESTS

Tires of size 7.50R16 having the construction shown in FIG. 1 were manufactured by way of trial according to the specification shown in Table 5, and their performance as to vehicle wandering and stability were evaluated by the vehicle test.

The test tires inflated to 7.0 kg/sq.cm were mounted on a 4-ton truck. Then, the wandering phenomenon and the stability were evaluated into 100 points by test driver's feeling, while running at a speed of 60 km/h under the specific load.

The stability is evaluated from stability in straight running, steering response whether heavy or not and quick or slow, smoothness when changing a lane, damping and road grip and so on.

It is apparent from Table 5 that Ex.1-4 tires according to the present invention are superior in both aspects of stability and the wandering phenomenon when compared to Ref. 1 tire according to the prior art and Ref. 2-4 tires.

As described above, in the present invention, a radial tire is provided with a narrow grooves near the tread edge, and accordingly the rigidity of the tire shoulder is lowered, whereby vehicle wandering is effectively suppressed to improve running stability, and the shock when riding over a rut can be alleviated to improve the ride.

The invention being thus described, it will be obvious that the same may be varied in many ways. Such variations are not to be ragarded as a departure from the spirit and scope of the invention, and all such modifications as would be obvious to one skilled in the art are intended to be included within the scope of the following claims.

TABLE 1

| Angle $\beta°$ | Wandering | Stability | |
|---|---|---|---|
| −5 | 90 | 87 | $\alpha$ = 30 degs. |
| 0 | 97 | 97 | |
| 5 | 97 | 100 | R1 = 20 mm |
| 10 | 90 | 90 | D1/D = 1.0 |

TABLE 2

| Angle $\alpha°$ | Wandering | Stability | |
|---|---|---|---|
| 15 | 90 | 90 | |
| 25 | 97 | 97 | $\beta$ = 2 degs. |
| 35 | 100 | 97 | R1 = 20 mm |
| 40 | 94 | 87 | D1/D = 1.0 |

TABLE 3

| R1 (mm) | Wandering | Stability | |
|---|---|---|---|
| 10 | 87 | 97 | $\alpha$ = 30 degs. |
| 15 | 100 | 100 | $\beta$ = 2 degs. |
| 35 | 97 | 97 | |
| 45 | 90 | 90 | D1/D = 1.0 |

TABLE 4

| D1/D | Wandering | Stability | |
|---|---|---|---|
| 0.5 | 87 | 87 | $\alpha$ = 30 degs. |
| 0.8 | 97 | 97 | $\beta$ = 2 degs. |
| 1.0 | 97 | 97 | R1 = 20 mm |
| 1.2 | 94 | 90 | |

TABLE 5

| | Reference | | | | Working Example | | | |
|---|---|---|---|---|---|---|---|---|
| | 1 | 2 | 3 | 4 | 1 | 2 | 3 | 4 |
| Angle $\alpha$ (°) | 30 | 20 | 40 | 30 | 30 | 35 | 30 | 25 |
| Angle $\beta$ (°) | — | 5 | 6 | −2 | 2 | 2 | 2 | 5 |
| Radius R1 (mm) | 20 | 10 | 45 | 20 | 20 | 20 | 15 | 15 |
| Ratio D1/D | — | 1.2 | 0.7 | 1.0 | 1 | 0.8 | 1 | 1.1 |
| Stability | 93 | 94 | 95 | — | 100 | 100 | 97 | 99 |
| Wandering | 93 | 94 | 95 | — | 97 | 97 | 100 | 97 |
| Amount of drift | 93 | 94 | 95 | — | 97 | 97 | 100 | 97 |
| Speed of drift | 93 | 94 | 95 | — | 97 | 97 | 100 | 97 |
| Damping | 93 | 96 | 97 | — | 97 | 100 | 100 | 97 |
| Handle response | 86 | 93 | 94 | — | 97 | 97 | 100 | 97 |
| Shoulder rubber tear occurred/not | no | no | no | yes | no | no | no | no |

We claim:
1. A pneumatic radial tire comprising a tread portion and a pair of buttress portions located one on each side of the tread portion adjacently to the tread portion, said tread portion provided with wide main grooves and narrow, straight axially outer grooves extending circumferentially of the tire, each of said narrow, straight axially outer grooves disposed in a boundary region between said tread portion and each buttress portion so that the radially outer edge of the axially outer groove sidewall thereof corresponds with an intersection between the surfaces of the tread portion and the buttress portion, said narrow, straight axially outer grooves being inclined axially inward at the bottom thereof at an angle of 0 to 5 degrees in a normal direction to the surface of the tread portion and at an axially inward position adjacent to said intersection, the contour of each buttress portion comprising a circular arc portion adjacent to said intersection having a radius R1 of 15 to 35 mm, and a tangent X to the buttress portion at said intersection being inclined at an angle of 25 to 35 degrees with respect to a tangent Y to the tread portion at said intersection.

2. The pneumatic radial tire according to claim wherein the ratio D1/D of the groove depth D1 of the narrow grooves to the groove depth D of said main groove is in the range from 0.8 to 1.1.

* * * * *